US010613512B2

(12) United States Patent
Ferry et al.

(10) Patent No.: US 10,613,512 B2
(45) Date of Patent: Apr. 7, 2020

(54) METHOD OF MANUFACTURING PARTS HAVING A DIMENSIONAL REQUIREMENT AKIN TO A TOLERANCE STACK-UP

(71) Applicant: Safran Aircraft Engines, Paris (FR)

(72) Inventors: Olivier Ferry, Moissy-Cramayel (FR); Arnaud Cambefort, Moissy-Cramayel (FR); Charles Cleret De Langavant, Moissy-Cramayel (FR); Pascal Courtin, Moissy-Cramayel (FR); Nicolas Hardouin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 137 days.

(21) Appl. No.: 15/532,477

(22) PCT Filed: Dec. 4, 2015

(86) PCT No.: PCT/FR2015/053325
§ 371 (c)(1),
(2) Date: Jun. 1, 2017

(87) PCT Pub. No.: WO2016/087797
PCT Pub. Date: Jun. 9, 2016

(65) Prior Publication Data
US 2018/0267508 A1    Sep. 20, 2018

(30) Foreign Application Priority Data

Dec. 5, 2014    (FR) ...................................... 14 61996

(51) Int. Cl.
*G05B 19/4093* (2006.01)
*G06Q 50/04* (2012.01)
*G06Q 10/06* (2012.01)

(52) U.S. Cl.
CPC ....... *G05B 19/40931* (2013.01); *G06Q 10/06* (2013.01); *G06Q 10/06395* (2013.01);
(Continued)

(58) Field of Classification Search
CPC ................................................ G05B 19/40931
See application file for complete search history.

(56) References Cited

U.S. PATENT DOCUMENTS

| 5,655,110 A * | 8/1997 | Krivokapic | ......... G03F 7/70625 |
| | | | 700/95 |
| 5,956,251 A * | 9/1999 | Atkinson | .................. G07C 3/14 |
| | | | 700/109 |
| 2008/0109195 A1 * | 5/2008 | Dischinger | ......... G06F 17/5086 |
| | | | 703/7 |

OTHER PUBLICATIONS

Better tolerancing trims costs Will, Chris M. Machine Design65.1: 44-44. (Jan. 8, 1993) (Year: 1993)*

(Continued)

*Primary Examiner* — Tejal Gami
(74) *Attorney, Agent, or Firm* — Womble Bond Dickinson (US) LLP

(57) ABSTRACT

The invention pertains to a method of manufacturing parts, where each part must satisfy a global dimensional requirement on a specific dimension of said part akin to a tolerance stack up comprising at least two tolerances, each tolerance corresponding to a characteristic dimension of the part, where: the global dimensional requirement is fixed so that the specific dimension of the parts has a mean $\mu_0$ and a standard deviation oG lying in a global acceptance range constructed on the basis of one or more statistical criteria; a reference dimension is chosen from among the characteristic dimensions, and a mean $\mu\Gamma\beta$ and a standard deviation oref of said reference dimension are calculated on the basis of a sample of collected parts; a range of acceptance for the other characteristic dimensions of the tolerance stack up constructed with the same statistical criterion or criteria as the global acceptance range is calculated on the basis of the global acceptance range and on the basis of the mean ITO and the standard deviation oref calculated for the reference (Continued)

dimension; the manufacture of parts is steered without verification of the reference dimension by using the acceptance range calculated for the other characteristic dimensions of the tolerance stack up by fitting the adjustment parameters of a manufacturing device so that each of the other characteristic dimensions of the tolerance stack up lie in the corresponding calculated acceptance range.

9 Claims, 7 Drawing Sheets

(52) U.S. Cl.
CPC ... *G06Q 50/04* (2013.01); *G05B 2219/40359* (2013.01); *G05B 2219/40542* (2013.01); *Y02P 90/30* (2015.11)

(56) References Cited

OTHER PUBLICATIONS

French Search Report, dated Jun. 10, 2015, French Application No. FR1461996.
International Search Report with English Language Translation, dated Feb. 11, 2016, Application No. PCT/FR2015/053325.
"Sommaire", LLP—Edition: Mar. 26, 2004, Mar. 26, 2004, 178 pages.
Adragna, Pierre-Antoine, "Tolerancement des Systemes Assembles, une approche par le Tolerancement Interiel et Modal", Laboratoire Symme, Universite de Savoie, Dec. 6, 2007, 240 pages.

* cited by examiner

METHOD OF MANUFACTURING PARTS HAVING A DIMENSIONAL REQUIREMENT AKIN TO A TOLERANCE STACK-UP

FIELD OF THE INVENTION

The invention relates to the use of statistical indicators in an industrial setting, for example in the aeronautics industry, in particular for facilitating monitoring and control of the manufacturing of parts.

PRIOR ART

The manufacture of parts, especially mechanical parts, in an industrial setting, is met with two opposing constraints: specifically, the increase in manufacturing throughput and volumes on the one hand, and the increased quality requisites on the other, which is particularly true in the aeronautical field.

Today it is impossible to perform quality control on all parts manufactured except to considerably impair manufacturing throughput. Statistical manufacturing indicators are therefore generally used, deducing overall information on the quality of the set of parts manufactured from specific information on the quality of a finite number of parts taken as samples.

Apart from controls at the end of production, which can be done on samples having a limited number of parts, checks are generally also made during production to be able to optionally regulate production flow, that is, adjust manufacturing conditions to ensure that the parts made continue to respond to the required quality criteria. In some cases, these statistical controls during production can result in production stopping completely, especially if the parts produced present excessive quality defects and the manufacturing flow must be completely reinitialised.

Quality controls are performed in relationship to a characteristic dimension of parts, which are manufactured. This characteristic dimension can be, for example, a particular dimension of the part, its mass, or any other measurable characteristic of said parts.

To perform statistical controls, several samples are taken successively, each sample comprising several parts of the manufacturing flow, and the characteristic dimension of each part of the sample taken are then measured. The value of a statistical indicator selected previously to monitor the quality of the manufacturing flow is calculated from the different measurements of the characteristic dimension of the parts of the sample taken.

There are various statistical indicators, which can be used to monitor the evolution of a manufacturing flow of parts, each statistical indicator giving different information for adjusting the manufacturing conditions in one way or another.

Most statistical indicators used for monitoring an industrial manufacturing process are calculated from an average $\mu$ and a standard deviation $\sigma$ of the measured characteristic dimension on several parts. More precisely, $\mu$ corresponds to the average of the decentring measured for the characteristic dimension relative to the reference value for this characteristic dimension.

An example is the centring coefficient, noted Cc, which shows restraint imposed on the variations of the average $\mu$ inside the tolerance interval IT. The tolerance interval IT is the deviation between the extreme admissible values of the characteristic dimension, therefore being calculated as the difference between the greater tolerance TS and the lesser tolerance TI of the measured characteristic dimension, or IT=TS−TI. The centring coefficient Cc is generally defined by the formula:

$$Cc = \frac{\mu}{(TS - TI)/2}$$

The manufacturing process can also be controlled by studying capability indices, which characterise the real performance of the method relative to the preferred performance. Such indices in fact measure the capacity of the manufacturing process to make parts whereof the characteristic dimensions are within the preferred tolerance interval IT.

Reference can be made, for example, to the capability index method Cp, which shows the aptitude of a manufacturing method to produce parts precisely and repeatedly. The larger the capability index Cp and the more the finished parts will be similar, whereas if the capability index Cp is low, production will be scattered. The capability index method Cp is defined generally by the formula:

$$Cp = \frac{(TS - TI)/2}{3\sigma}$$

The disadvantage of such a capability index method Cp is that a positive result (that is, high) can also correspond to production outside the limits of tolerance. In fact, the industrial conformity of a manufacturing flow depends on scope, that is to say, not only its dispersion aim, but also the position of its average relative to the tolerance interval IT. Another capability index used is therefore the capability index Cpk, which shows dispersion aim also the centring of the production relative to the limits of tolerance. In this case, when the capability index Cpk is high, this means that production can be repeated and that it is also centred in the tolerance interval IT, that is, there will be less risk that parts are manufactured outside tolerances. The capability index Cpk is defined generally by the formula:

$$Cpk = \frac{\text{Min}(TS - \mu; \mu - TI)}{3\sigma}$$

There are of course other statistical indicators having specific properties, and which can be used as a function of the needs to regulate the manufacturing process.

The manufacturing of parts mechanical is however often highly complex, involving several manufacturing steps and many characteristic dimensions, which must be regulated and controlled so that the final part responds to the preferred manufacturing criteria.

In this way, when there is a particular dimensional requirement on a part to be manufactured, this functional requirement generally relating to a specific dimension of the part, it is in general the result of a succession of different manufacturing steps, for example a succession of different machinings, corresponding to as many intermediate characteristic dimensions. In such cases this overall dimensional requirement can is equivalent to a tolerance stack-up, where each of the dimensions corresponds to a characteristic dimension of the part.

One of the possibilities for monitoring production of such parts can consist of focusing on said overall dimensional requirement and controlling only the corresponding specific dimension, that is, once the part has been completely machined. But such production monitoring is not satisfactory since it validates or excludes production only and fails to correct machining during manufacturing.

More current production monitoring, which has predictive and corrective measurements during manufacturing, therefore comprises controlling the different characteristic dimensions of the tolerance stack-up forming the specific dimension. In this way, if one of the characteristic dimensions deviates from the corresponding area of acceptance so that the final part has an acceptable specific dimension, the part can be acted on as it is being manufactured, for example by contributing machining corrections so as to produce an acceptable final part.

The problem is that there are some characteristic dimensions whereof the formation is not or is minimally manageable and/or which cannot be or minimally be rectified after having been taken. The specific dimension of the final part cannot in this case be fully controlled during production, except for imposing areas of acceptance highly restricted to different characteristic dimensions whereof manufacturing is manageable, which boosts the rework rate and/or rectification rate of parts during manufacturing.

An aim of the present invention is therefore to provide a monitoring method of a manufacturing flow of parts, which resolves at least one of the above disadvantages.

In particular, an aim of the present invention is to provide a monitoring method of a manufacturing flow of parts, which has to satisfy an overall dimensional requirement having a lower rework rate and/or a lower rectification rate of parts during manufacturing.

An aim of the present invention is especially to provide an improved method of tracking a manufacturing flow of parts, which has to satisfy an overall dimensional requirement and where one of the characteristic manufacturing dimensions is not or is barely manageable and/or this dimension cannot be or barely can be rectified.

SUMMARY OF THE INVENTION

For this reason a method of manufacturing of parts produced with a manufacturing device is proposed, where each part must satisfy an overall dimensional requirement on a specific dimension of said part, said overall dimensional requirement being akin to a tolerance stack-up comprising at least two dimensions, each dimension corresponding to a characteristic dimension of the part, in which:

The overall dimensional requirement is fixed so that the specific dimension of the parts has an average $\mu_G$ and a standard deviation $\sigma_G$ in an overall area of acceptance constructed from one or more statistical criteria;

A reference dimension is selected from among the characteristic dimensions comprising the tolerance stack-up, and an average $\mu_{ref}$ and a standard deviation $\sigma_{ref}$ of said reference dimension are calculated from a sample of parts taken from among the parts produced with the manufacturing device;

An area of acceptance for the other characteristic dimensions of the tolerance stack-up is calculated from the overall area of acceptance and from the average $\mu_{ref}$ and the standard deviation $\sigma_{ref}$ calculated for the reference dimension, the area of acceptance being constructed with the statistical criteria or the same statistical criteria as the overall area of acceptance;

The manufacturing of parts without verification of the reference dimension is controlled by using the area of acceptance calculated for the other characteristic dimensions of the tolerance stack-up by adjusting the regulating parameters of the manufacturing device so that each of the other characteristic dimensions of the tolerance stack-up is included in the corresponding calculated area of acceptance.

The manufacturing of parts is preferably controlled by conducting the following successive steps for each sample of parts taken:

measurement for each part of the sample of the other characteristic dimensions with the exception of the reference dimension;

calculation for each of the other measured characteristic dimensions of an average $\mu_i$ and a standard deviation $\sigma_i$;

adjustment of the regulating parameters of the manufacturing device so that each of the other characteristic dimensions of the tolerance stack-up has an average $\mu_i$ and a standard deviation $\sigma_i$ in the corresponding calculated area of acceptance.

Each of the steps presented is preferably conducted automatedly.

The measuring step of the characteristic dimensions can be conducted with a measuring device, for example comprising sensors for performing automated measuring of specific dimensions of the part.

The calculation steps can be taken by any appropriate calculation device, such as, for example, processing computer data means such as a computer.

The regulating step can be taken, for example, by a regulating device integrating processing means for integrating and processing data originating from the calculation steps so as to correct any deviation detected in production and correct production flow. In particular, the regulating device is provided to correct the input parameters of the production device from which parts originated.

The regulating device therefore preferably adjusts the regulating parameters of the manufacturing device used to make the parts so that some characteristic dimensions of the tolerance stack-up have an average $\mu_i$ and a standard deviation $\sigma_i$ in the corresponding calculated area of acceptance.

Preferred, though nonlimiting, aspects of this method, taken singly or in combination, are the following:

the area of acceptance of the other characteristic dimensions of the tolerance stack-up is calculated from the limit values of average $\mu_{GL}$ and standard deviation $\sigma_{GL}$ forming the overall area of acceptance for the specific dimension and from the average $\mu_{ref}$ and of the standard deviation $\sigma_{ref}$ calculated for the reference dimension.

the area of acceptance of the other characteristic dimensions of the tolerance stack-up is calculated by taking $\mu_i = \mu_{GL} - \mu_{ref}$ and $\sigma_i = \sqrt{\sigma^2_{GL} - \sigma^2_{ref}}$, where $\mu i$ and $\sigma i$ are respectively the average and the standard deviation of the corresponding characteristic dimension.

the limits of the area of acceptance of the other characteristic dimensions of the tolerance stack-up are calculated by taking the strictest values limits for the statistical criterion or the statistical criteria used.

the different areas of acceptance are illustrated on a control graphic ($\mu;\sigma$) having as abscissa the average $\mu$ and as ordinate the standard deviation $\sigma$ of the characteristic dimension and are constructed according to the limits of the statistical criterion or criteria used for the overall dimensional requirement.

the area of acceptance of the other characteristic dimensions of the tolerance stack-up is constructed graphically according to the following successive steps:

Applying to the overall area of acceptance in the control graphic (μ;σ) a transform according to the average $\mu_{ref}$ and the standard deviation $\sigma_{ref}$ calculated for the reference dimension; then Extrapolating the overall area of acceptance transformed for constructing the area of acceptance of the other characteristic dimensions of the tolerance stack-up by taking the strictest values limits for the statistical criterion or the statistical criteria used.

control graphic (μ;σ) is displayed on a control monitor.

the overall area of acceptance is constructed from one or more statistical indicators selected from among:

a first capability index Cpk defined by the formula:

$$Cpk = \frac{\text{Min}(TS - \mu; \mu - TI)}{3\sigma}$$

a second capability index Cp defined by the formula:

$$Cp = \frac{(TS - TI)/2}{3\sigma}$$

a centring coefficient Cc defined by the formula:

$$Cc = \frac{\mu}{(TS - TI)/2}$$

where:
μ is an average and σ a standard deviation of a measured characteristic dimension on several parts;
TS is an upper tolerance of the measured characteristic dimension;
TI is a lower tolerance of the measured characteristic dimension.
the selected reference dimension corresponds to the characteristic dimension having the least controllable manufacturing parameters from among the different characteristic dimensions comprising the tolerance stack-up.

According to a preferred embodiment of this method, the tolerance stack-up comprises only two dimensions corresponding respectively to a first characteristic dimension and a second characteristic dimension of the part, in which:

The reference dimension corresponds to the first characteristic dimension of the tolerance stack-up;
The area of acceptance of the second characteristic dimension of the tolerance stack-up is calculated from the overall area of acceptance and from the average $\mu_{ref}$ and the standard deviation $\sigma_{ref}$ calculated for the first characteristic dimension, the area of acceptance being constructed with the statistical criteria or the same statistical criteria as the overall area of acceptance;
The manufacturing flow of parts is regulated without verification of the first characteristic dimension by using the area of acceptance calculated for the second characteristic dimension of the tolerance stack-up, for example by adjusting the regulating parameters of the manufacturing device so that the second characteristic dimension of the tolerance stack-up is included in the corresponding calculated area of acceptance.

DESCRIPTION OF FIGURES

Other characteristics and advantages of the invention will emerge from the following description, which is purely illustrative and nonlimiting and must be viewed in conjunction with the attached diagrams, in which.

DETAILED DESCRIPTION OF THE INVENTION

Figure 1:
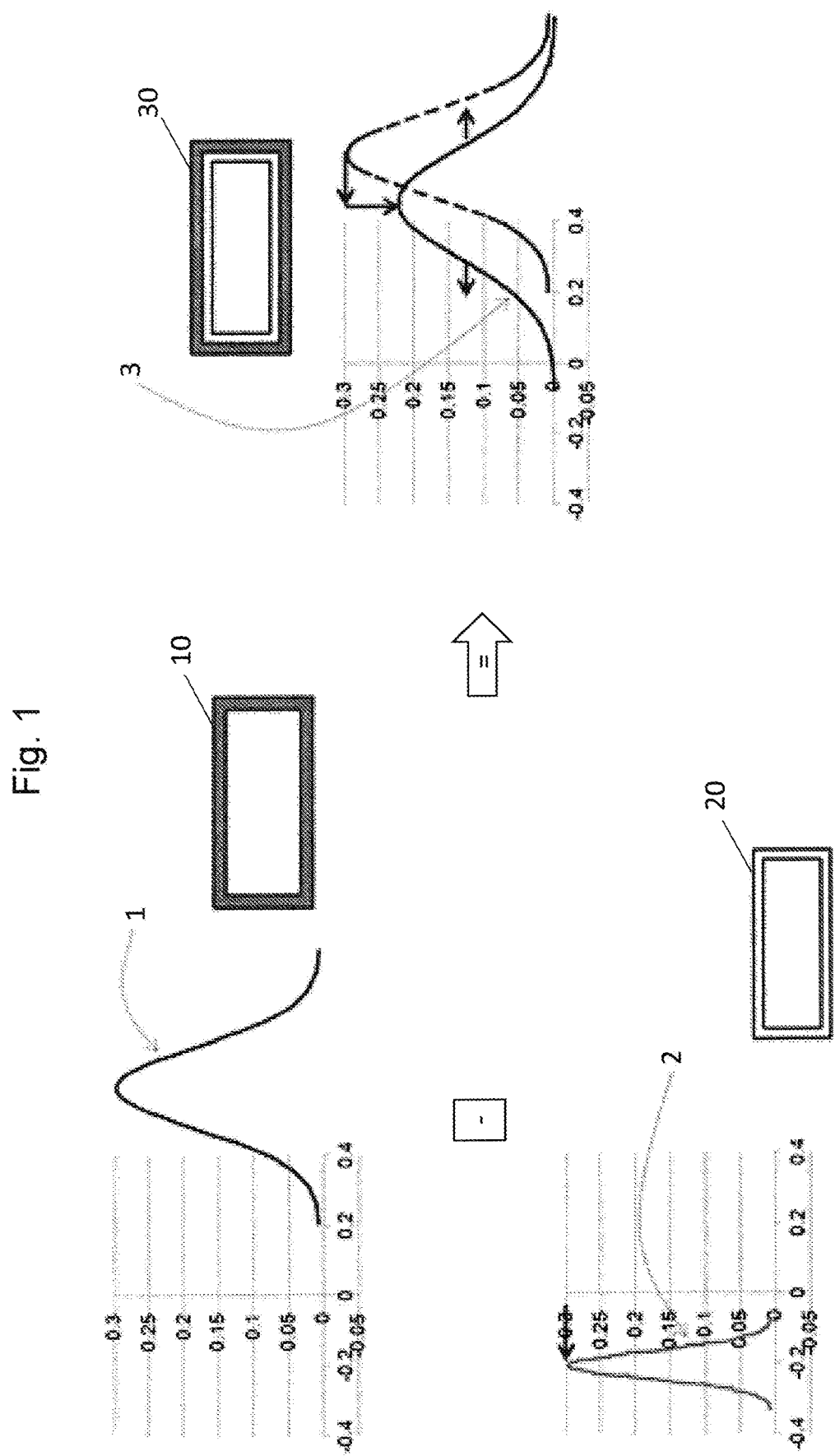
FIG. 1 diagrammatically illustrates the restrictions due to a dimensional requirement depending on several particular characteristic dimensions, in the particular example of the deposit of a thermal barrier layer in a passage section of a mechanical part.

The general principle of the invention comprises assimilating a dimensional requirement relating to a dimensional characteristic specific to a tolerance stack-up where each dimension corresponds to a characteristic dimension of the part.

From among the different characteristic dimensions forming the tolerance stacku, one is identified whereof machining is the least manageable and/or whereof the rectification is the most difficult. This characteristic dimension is selected and serves as reference for monitoring production of parts, and is called reference dimension.

Machining that is barely or not manageable is machining having a very random result despite identical input parameters and identical manufacturing conditions.

The other characteristic dimensions of the tolerance stack-up serve as adjustment variables for satisfying the dimensional requirement required by taking into account the values of the reference dimension.

The final assembly sees its conformity sanctioned by statistical tolerances, comprising, for example, a centring coefficient Cc and a capability index Cpk. In this way, it is advantageous to take into account the impact of the non-controlled dimension, called reference dimension, on the final assembly not only in terms of decentring of the average but also in terms of dispersion engendered on the registered values.

In this way, according to the proposed monitoring method an average $\mu_{ref}$ and a standard deviation $\sigma_{ref}$ of the selected reference dimension are calculated from a sample of parts taken in the manufacturing flow, where $\mu_{ref}$ is the average of the decentring δ measured on the sample concerning the reference dimension, and $\sigma_{ref}$ is the standard deviation measured on the sample.

The overall dimensional requirement is fixed so that the specific dimension of the parts has an average $\mu_G$ and a standard deviation $\sigma_G$ contained in an overall area of acceptance constructed from one or more statistical criteria. The overall area of acceptance can, for example, be constructed from a centring coefficient Cc and a capability index Cpk where the aim is for the values to be contained within certain limits.

Given the overall area of acceptance of the specific dimension for a part to be acceptable in terms of production, and having calculated the average $\mu_{ref}$ and the standard deviation $\sigma_{ref}$ for the reference dimension, an area of acceptance can be calculated for the other characteristic dimensions of the tolerance stack-up, this area of acceptance preferably being constructed with the statistical criteria or the same statistical criteria as the overall area of acceptance.

In this way, controlling the characteristic dimension or the other characteristic dimensions to be inside the area of acceptance now calculated ensures that the specific dimension also stays in its overall area of acceptance, and therefore the dimensional requirement for the part is respected, therefore validating the analysed part.

Consequently, the manufacturing flow of parts is controlled without need to verify the reference dimension during monitoring, by using only the area of acceptance calculated for the other characteristic dimensions of the tolerance stack-up.

Such a method is particularly advantageous since this ensures respect of the overall dimensional requirement, which can be complex, without the need to be too strict for what relates to the characteristic dimensions since the method takes into account not only the average $\mu_{ref}$ of the reference dimension but also its standard deviation $\sigma_{ref}$.

As is preferred, the area of acceptance of the other characteristic dimensions of the tolerance stack-up is calculated from the limit values of average $\mu_{GL}$ and standard deviation $\sigma_{GL}$ forming the overall area of acceptance for the specific dimension and from the average $\mu_{ref}$ and of the standard deviation $\sigma_{ref}$ calculated for the reference dimension.

According to a particular embodiment, the area of acceptance of the other characteristic dimensions of the tolerance stack-up is calculated by taking $\mu_i = \mu_{GL} - \mu_{ref}$ and $\sigma_i = \sqrt{\sigma^2_{GL} - \sigma^2_{ref}}$, where $\mu_i$ and $\sigma_i$ are respectively the average and the standard deviation of the corresponding characteristic dimension.

According to this calculation, the limits of the area of acceptance of the characteristic dimensions of the tolerance stack-up can be defined by taking the strictest values limits for the statistical criterion or the statistical criteria used.

The calculated area of acceptance is preferably valid for all the other characteristic dimensions of the tolerance stack-up.

In the embodiment where the tolerance stack-up comprises only two dimensions, one of the two characteristic dimensions of the tolerance stack-up is taken as reference dimension, then the area of acceptance of the other characteristic dimension of the tolerance stack-up is calculated from the overall area of acceptance and from the average $\mu_{ref}$ and the standard deviation $\sigma_{ref}$ calculated for the reference dimension, this area of acceptance preferably being constructed with the statistical criteria or the same statistical criteria as the overall area of acceptance. The manufacturing flow of parts is then controlled without verification of the reference dimension by using the area of acceptance calculated for the second characteristic dimension of the tolerance stack-up.

The present invention is described hereinbelow in reference to a particular but non limiting example of the production of mobile blades for engines in the field of aeronautics, or any similar part, whereof a passage section must be covered by a thermal barrier layer.

Such a thermal barrier layer considerably influences the passage section of these bladings. The sections of passage of many bladings form the object of a statistical definition, imposed by the final use of the produced, corresponding to the overall dimensional requirement.

The method of deposit of thermal barrier, although very repeatable in general, is difficult to control, and even more to rectify. For this reason, when nonconformities relative to statistical criteria imposed on the passage section are observed, acting on the deposit of thermal barrier is generally not possible. The sole possibility is to act on the value of the passage section of the part after machining and prior to deposit of thermal barrier, which is possible by machining the foot of the part differently.

For the passage section prior to deposit of thermal barrier there is a value recorded in the plan, with a nominal and tolerances, but this nominal and these tolerances assume standard deposit of thermal barrier, which should finally result in a compliant passage section, that is, being in the overall area of acceptance of the specific dimension.

When deviations to the specification are observed during deposit of the thermal barrier (or in terms of deposit of thermal barrier the specification has changed without the final need having been modified), respect of this nominal and these tolerances prior to deposit of thermal barrier engenders nonconformities on the passage section after thermal barrier. Therefore which new nominal and which new tolerances must be applied to the passage section of the part prior to deposit of thermal barrier must be known so that the individual and statistical criteria relating to the conformity of production are respected.

This problem is illustrated in FIG. 1 illustrating the variability 1 of the passage section prior to thermal barrier 10, the variability 2 of the thermal barrier 20, and the variability 3 of the passage section after thermal barrier 30. It is evident in this FIG. 1 that the passage section is smaller due to deposit of the thermal barrier, which is logical, but above all it is more dispersed due to the variability of the thermal barrier.

This particular example of deposit of a barrier layer in a passage section can resemble a tolerance stack-up having two links, one of the links (the thickness of thermal barrier deposited) being noncontrollable, and the other of the links (the passage section prior to deposit of thermal barrier) contributes to serving as adjustment variable to finally ensure conformity of the assembly.

The final assembly will see its conformity sanctioned by statistical tolerances, consisting classically of a Cpk and a Cc. This is the reason for which it is important to take into account the impact of the dimension not controlled on the final assembly not only in terms of decentring of the average but also dispersion produced on the recorded values.

The assembly of a value of passage section prior to thermal barrier having as its characteristics an average $\mu_{SdP\ prior\ to\ BT}$ and a standard deviation $\sigma_{SdP\ prior\ to\ BT}$, with deposit of thermal barrier causing obstruction to the passage section having as its characteristics an average $\mu_{BT} < 0$ (since deposit of a barrier layer reduces the passage section) and a standard deviation $\sigma_{BT}$ to form a final passage section having as its characteristics an average $\mu_{SdP\ final}$ and a standard deviation $\sigma_{SdP\_final}$ having to respond to some criteria translates into the following relationships:

$$\mu_{SdP\_final} = \mu_{SdP\_prior\ to\ BT} + \mu_{ST}$$

$$\sigma^2_{SdP\_final} = \sigma^2_{SdP\_prior\ to\ BT} + \sigma^2_{BT}$$

A graphic tool called "Plan Variance-decentring" can be used, in which the average $\mu$ of the decentring is carried as abscissa and as ordinates the variance (that is, the square of the standard deviation $\sigma$). In this graphic, each population is consequently illustrated by a point.

The above relationships translate into the fact that the effect of deposit of thermal barrier is to translate the population of sections of passage of the part in the variance-decentring plane of a vector $\vec{v}$ of coordinates ($\mu_{BT}$; $\sigma^2_{BT}$).

Figure 2:
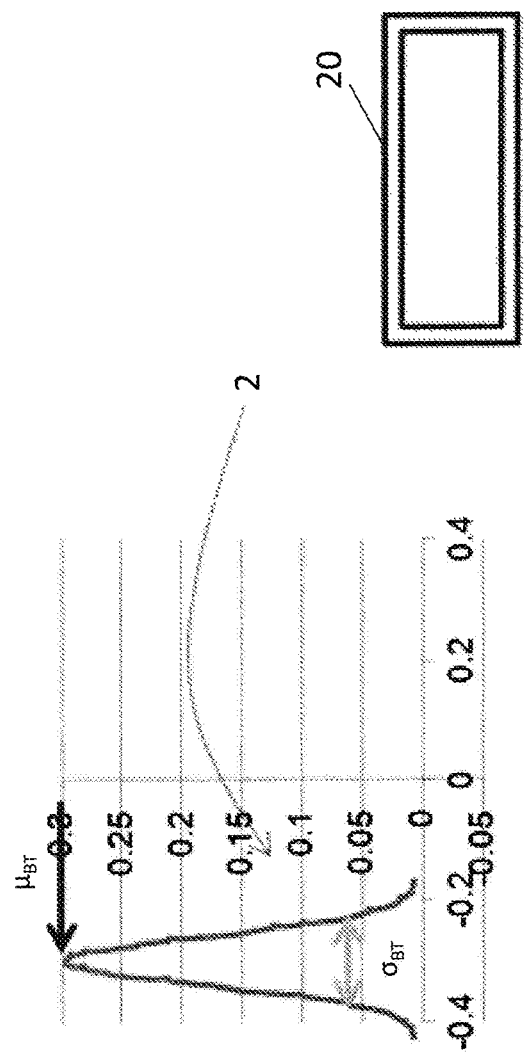
FIG. 2 is a graphic of density of probability illustrating the variability of the thermal barrier layer.
Figure 3:
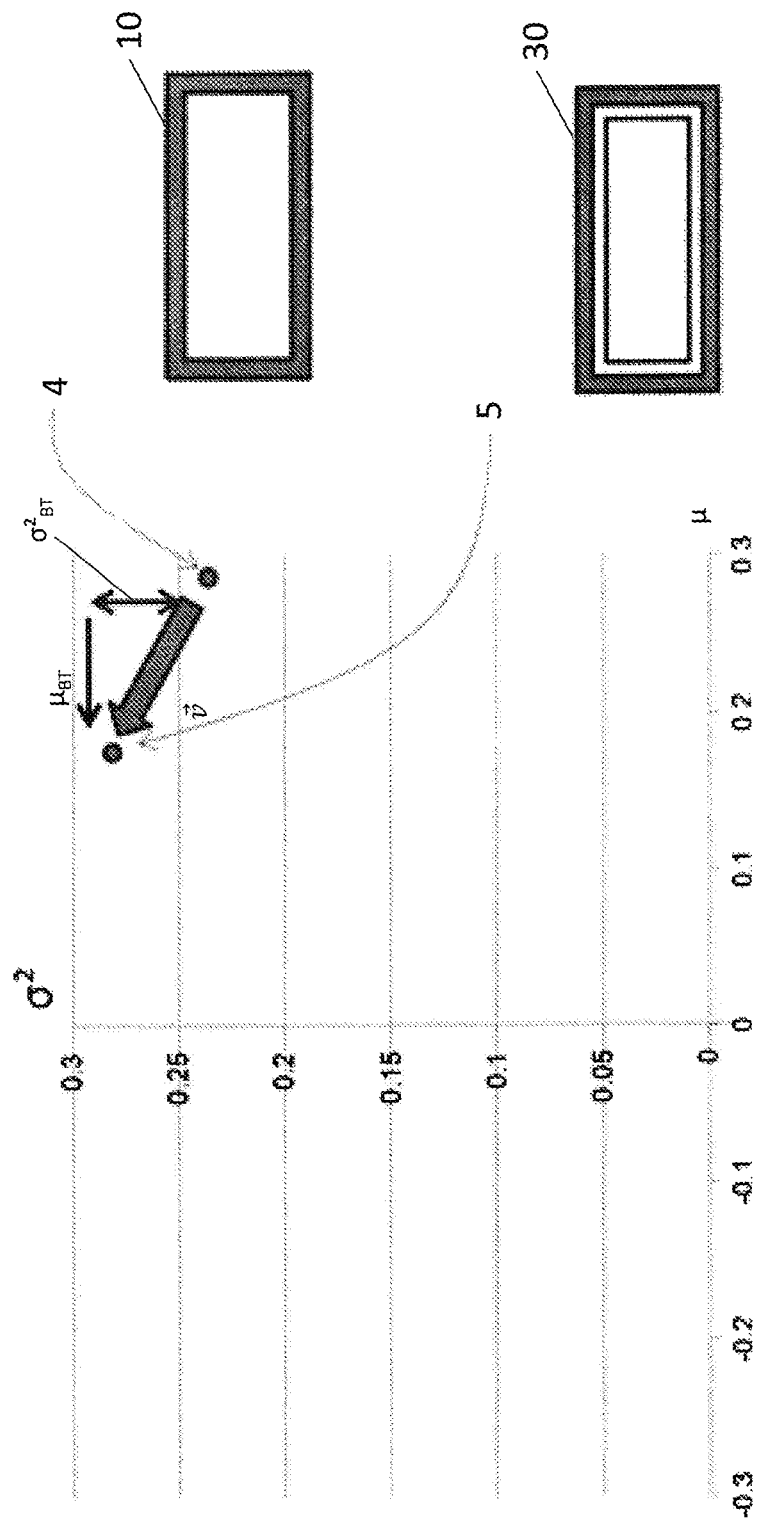
FIG. 3 is a graphic in (μ;σ²) illustrating the evolution of the passage section prior to and after the deposit of the barrier layer.

If variability of the thermal barrier 20 such as illustrated in FIG. 2 is considered, characterised by an average $\mu_{BT}$ and a standard deviation $\sigma_{BT}$, translation in the variance-decentring plane can be represented as on the graphic of FIG. 3 where point 4 corresponds to the section of the passage prior to thermal barrier, while point 5 corresponds to the section of the passage after thermal barrier.

The technical solution proposed consists of representing in the variance-decentring diagram the area of acceptance containing all the populations of sections of passage after deposit of thermal barrier admissible in light of statistical criteria listed in the manufacturing plan.

Figure 4:
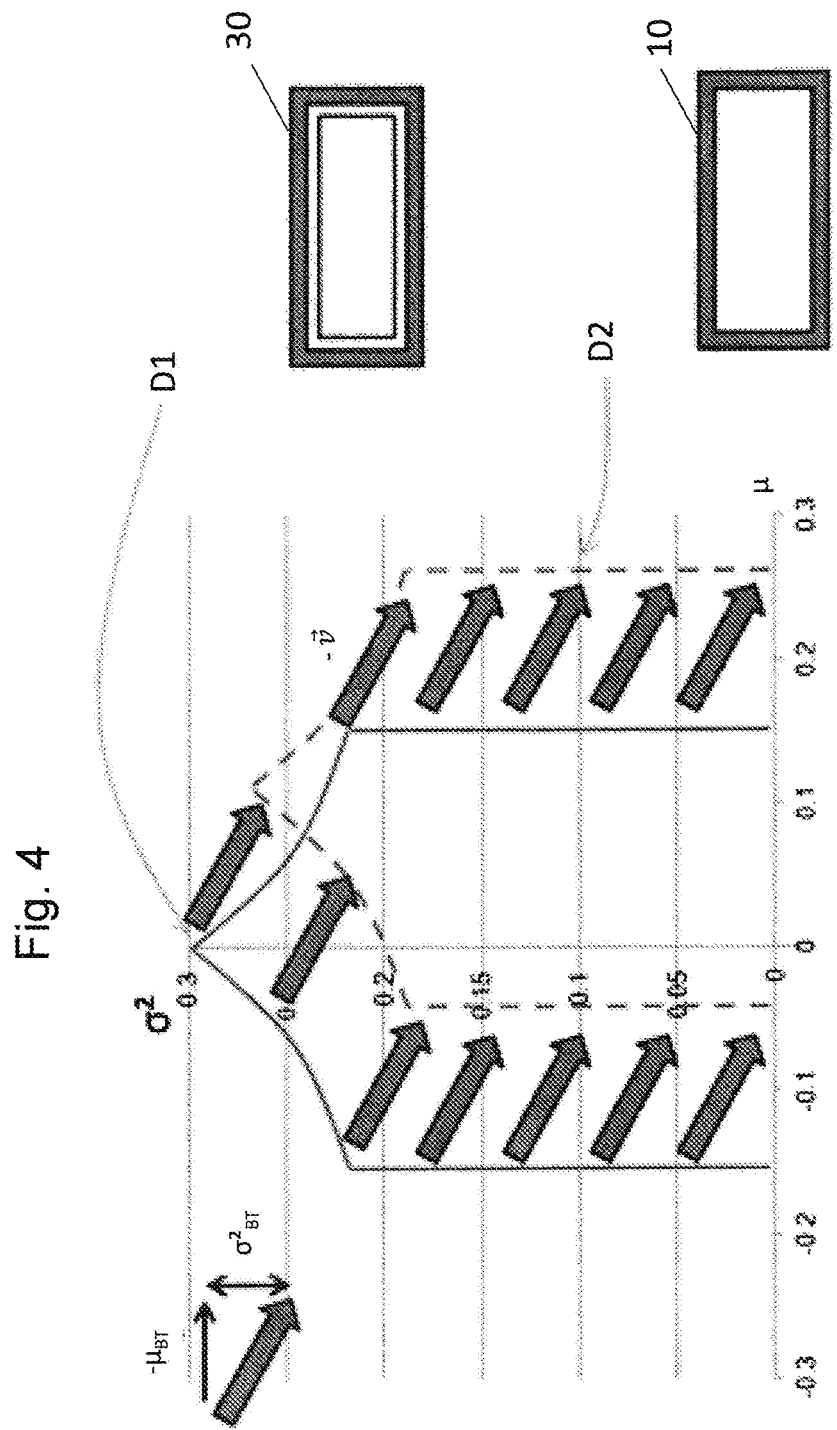
FIG. 4 is a graphic in (μ;σ²) illustrating determination of the area of acceptance of the passage section prior to deposit of the barrier layer as a function of the statistical values of the barrier layer and of the area of acceptance of the passage section prior to deposit of the barrier layer.

Typically, in the event where the statistical criteria consist of a Cpk and a Cc less than 1, this area of acceptance D1 resembles a tent hoisted by walls, as is illustrated in FIG. 4. This area of acceptance D1 is then offset by a vector $-\vec{v}$ to produce the area of acceptance D2 in which the population of sections of passage should be located prior to deposit of thermal barrier so as to respond, after deposit of thermal barrier (embodied by a translation of vector $\vec{v}$ in this graphic) to the "passage section after deposit of thermal barrier" criteria included in the plan.

As seen in graphic of FIG. 4, the area of acceptance D2 for the sections of passage prior to deposit of thermal barrier constructed in this way tolerates larger sections of passage (as the effect of the thermal barrier is to obstruct the passage section), but less dispersed (as the dispersion produced by the deposit of thermal barrier is added to that initially present in the population prior to deposit of thermal barrier).

For easier graphic reading of areas of acceptance, it is preferable to use diagrams of standard deviation-decentring type, also called diagrams ($\mu$;$\sigma$), in which is carried as abscissa the average $\mu$ of the decentring and as ordinates the standard deviation $\sigma$.

In such a type of graphic the representation of statistical criteria and their respective limits of acceptance defining the different areas of acceptance is simpler, and therefore far easier to execute.

For example, in this type of diagram ($\mu$;$\sigma$), the iso-Cc are illustrated by vertical straight lines and the iso-Cpks by oblique straight lines cutting the axis of abscissa at the level of tolerances.

Figure 5:
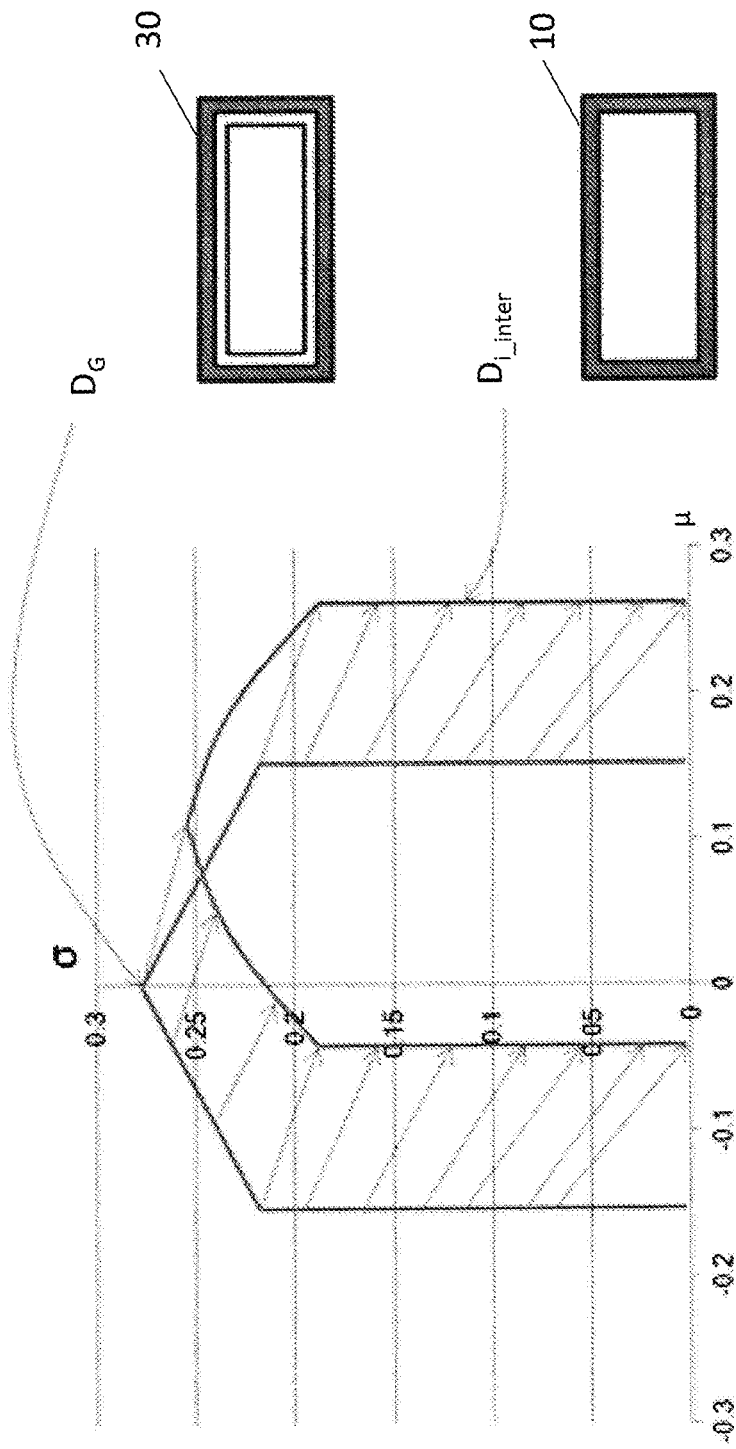
FIG. 5 is a graphic in (μ;σ) illustrating determination of the area of acceptance of the passage section prior to deposit of the barrier layer as a function of the statistical values of the barrier layer and of the area of acceptance of the passage section prior to deposit of the barrier layer.

In this way, an overall area of acceptance $D_G$, that is, the area of acceptance of the passage section after deposit of thermal barrier, defined by a centring coefficient Cc and a capability index Cpk, has the appearance of a house as is illustrated in FIG. 5.

But here, the effect of the deposit of the thermal barrier on a population illustrated by a point in this diagram is not similar to simple translation of the overall area of acceptance.

Therefore the area of acceptance $D_{i\_inter}$ of the values of the passage section is calculated prior to deposit of the thermal barrier by taking:

$$\mu_{SdP\_prior\ to\ BT} = \mu_{SdP\_final} - \mu_{BT}$$

$$\sigma_{SdP\_prior\ to\ BT} = \sqrt{\sigma^2_{SdPfinal} - \sigma^2_{BT}}$$

The variance-decentring for constructing this area is therefore passed through the diagram, and it is converted in the diagram $\mu$-$\sigma$ to quantify the limits thereof in terms of tolerances, Cc and Cpk, as illustrated in FIG. 5.

The new area of acceptance $D_{i\_inter}$ calculated in this way in the plane $\mu$-$\sigma$ no longer has the same form as the initial area since it is not a simple shift of the overall area of acceptance.

For example, when the area of acceptance after deposit of thermal barrier is constructed by imposition of a Cpk and a Cc, the area of acceptance after deposit of thermal barrier $D_G$ in the plane $\mu$-$\sigma$ has the form of a house, whereas the area of acceptance prior to deposit of thermal barrier $D_{i\_inter}$ constructed by the method described hereinabove resembles a crossed vault hoisted by two walls, as seen in FIG. 5.

Figure 6:
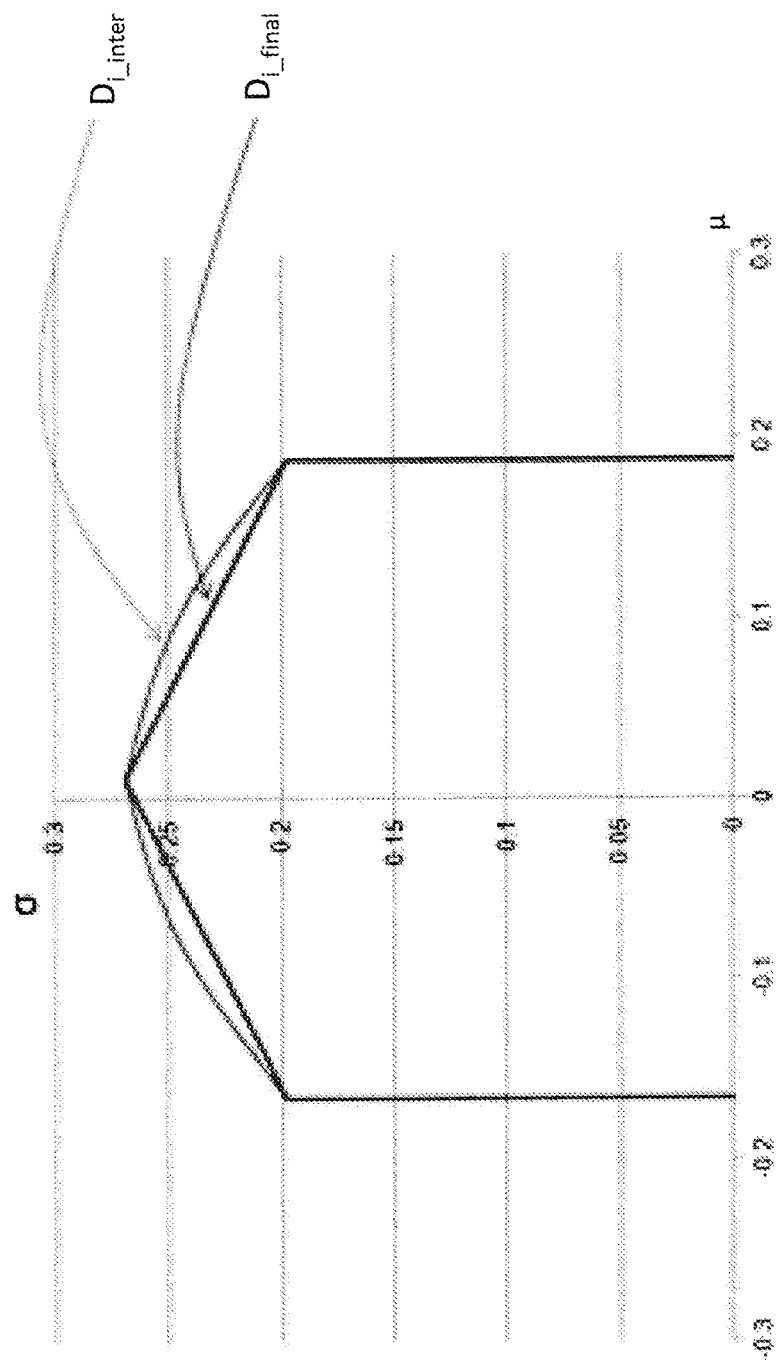
FIG. 6 is a graphic in (δ;σ) illustrating the final extrapolation step for determining the area of acceptance of the passage section prior to deposit of the barrier layer.

If the aim is to delimit the area of acceptance prior to deposit of thermal barrier by statistical criteria similar to those employed for the passage section after deposit of thermal barrier, that is, a centring coefficient Cc and a capability index Cpk, it suffices to list a house in the crossed vault and calculate the preferred area of acceptance $D_{i\_final}$ (see FIG. 6). Determination of this area of acceptance $D_{i\_final}$ can be done by calculation or by extrapolation graphic.

The method proposed is particularly advantageous as it takes into account the impact of the defective process, that is, of the dimension whereof the manufacturing is minimally regulated and/or minimally rectifiable, not only in terms of average of the decentring but also in terms of dispersion.

Initial naive reasoning results in simply "degreasing" the nominal prior to thermal barrier of the average value of the deviation observed in the deposit of thermal barrier.

In the example above of the passage section with deposit of a thermal barrier layer, the method proposed takes into account the fact that the variability observed on the deposited thickness of thermal barrier has repercussions on the passage section. This prevents cases where good production relative to statistical requirements in the framework offset by the average deviation observed on the deposit of thermal barrier was sanctioned as poor after deposit of thermal barrier, because its dispersion resulted in its being deemed unacceptable in terms of the statistical requirements after deposit of thermal barrier.

The method proposed can be executed in a manufacturing chain of parts, which can be fully or partially automated, where checks during production regulate the manufacturing flow, that is, adjust the manufacturing conditions to ensure that the manufactured parts continue to respond to the required criteria of qualities.

Figure 7:
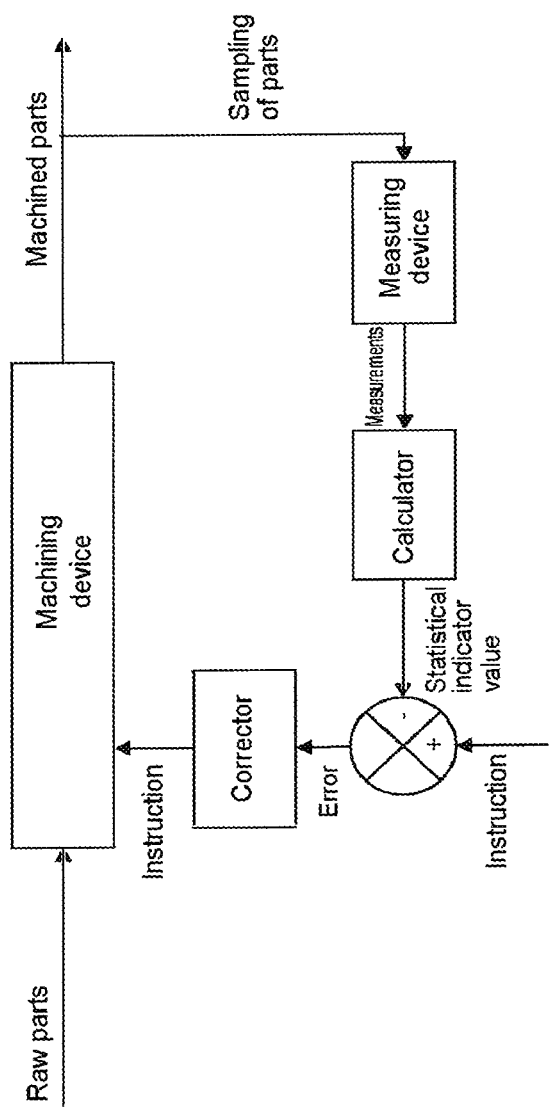
FIG. 7 is a diagram illustrating a production chain integrating control and regulating of production with sampling of parts.

FIG. 7 gives an example of such a manufacturing chain in which a machining device, such as, for example, a 5-axle machine, is used to make parts according to a specific instruction. The specific instruction can, for example, relate to an overall dimensional requirement. In place of the machining device a manufacturing device not limited to the machining of parts could of course be used.

In this automated production chain parts are taken when leaving the machining device to form a sample and are transmitted to a measurement device, which measures one or more characteristic dimensions of each part of the sample taken. Such a measuring device can, for example, be a three-dimensional measuring device having sensors, which automatically measure the preferred characteristic dimensions of each of the parts.

The measuring data originating from the measurement device are then transmitted to a calculation device, which processes them to calculate one or more statistical indicators representative of one of the characteristic dimensions of the parts.

The calculated value of the statistical indicator is then compared to a reference instruction on the characteristic dimension to regulate the manufacturing flow. More precisely, the results of this comparison optionally adjust the input parameters of the machining device.

If a deviation is noticed, implying an error, for example if the value of the statistical indicator on the characteristic dimension is outside an acceptable range defined by the reference instruction, corrective measurements are determined by a corrector to adjust the input parameters of the machining device. The aim of the modifications of the input parameters of the machining device is to correct the deviation noticed so that the value of the statistical indicator on the characteristic dimension is again in an acceptable range.

The invention claimed is:

1. Method of manufacturing parts produced with a manufacturing device, where each part must satisfy an overall dimensional requirement on a specific dimension of said part, said overall dimensional requirement being akin to a tolerance stack up comprising at least two dimensions, each dimension corresponding to a characteristic dimension of the part, in which:
the overall dimensional requirement is fixed so that the specific dimension of the parts has an average $\mu_G$ and a standard deviation $\sigma_G$ in an overall area of acceptance constructed from one or more statistical criteria;
a reference dimension is selected from among the characteristic dimensions comprising the tolerance stack-up, and an average $\mu_{ref}$ and a standard deviation $\sigma_{ref}$ of said reference dimension are calculated from a sample of parts taken from among the parts produced with the manufacturing device;
an area of acceptance for the other characteristic dimensions of the tolerance stack-up is calculated from the overall area of acceptance, from the average $\mu_{ref}$ and the standard deviation $\sigma_{ref}$ calculated for the reference dimension, from limit values of an average $\mu_{GL}$ and a standard deviation $\sigma_{GL}$ forming the overall area of acceptance for the specific dimension, and by taking $\mu_i=\mu_{GL}-\mu_{ref}$ and $\sigma_i=\sqrt{\sigma^2_{GL}-\sigma^2_{ref}}$ where $\mu_i$ and $\sigma_i$ are respectively an average and a standard deviation of the corresponding characteristic dimension the area of acceptance being constructed from the same one or more statistical criteria of the overall area of acceptance; and
the manufacturing of parts without verification of the reference dimension is controlled by using the area of acceptance calculated for the other characteristic dimensions of the tolerance stack-up by adjusting regulating parameters of the manufacturing device so that each of the other characteristic dimensions of the tolerance stack-up is included in the corresponding calculated area of acceptance.

2. The method as claimed in claim 1, in which the manufacturing of parts is controlled by conducting the following successive steps for each sample of parts taken:
measurement for each part of the sample of the other characteristic dimensions with the exception of the reference dimension;
calculation for each of the other measured characteristic dimensions of the average $\mu_i$ and the standard deviation $\sigma_i$; and
adjustment of the regulating parameters of the manufacturing device so that each of the other characteristic dimensions of the tolerance stack-up has an average $\mu_i$ and a standard deviation $\sigma_i$ in the corresponding calculated area of acceptance.

3. The method as claimed in claim 1, in which limits of the area of acceptance of the other characteristic dimensions of the tolerance stack-up are calculated by taking strictest values limits for the same one or more statistical criteria used for the overall dimensional requirement.

4. The method as claimed in claim 1, in which one or more areas of acceptance are illustrated on a control graphic ($\mu;\sigma$) having as abscissa the average $\mu$ and as ordinate the standard deviation $\sigma$ of the characteristic dimension and are constructed according to limits of the same one or more statistical criteria used for the overall dimensional requirement.

5. The method as claimed in claim 4, in which the area of acceptance of the other characteristic dimensions of the tolerance stack-up is constructed graphically according to the following successive steps:
applying to the overall area of acceptance in the control graphic ($\mu;\sigma$) a transform according to the average $\mu_{ref}$ and the standard deviation $\sigma_{ref}$ calculated for the reference dimension; and
extrapolating the overall area of acceptance transformed for constructing the area of acceptance of the other characteristic dimensions of the tolerance stack-up by taking strictest values limits for the same one or more statistical criteria used.

6. The method as claimed in claim 4, in which the control graphic ($\mu;\sigma$) is displayed on a control monitor.

7. The method as claimed in claim 1, in which the overall area of acceptance is constructed from one or more statistical indicators selected from among:
a first capability index Cpk defined by the formula:

$$Cpk = \frac{\text{Min}(TS - \mu; \mu - TI)}{3\sigma}$$

a second capability index Cp defined by the formula:

$$Cp = \frac{(TS - TI)/2}{3\sigma}$$

a centring coefficient Cc defined by the formula:

$$Cc = \frac{\mu}{(TS - TI)/2}$$

where:
$\mu$ is an average and $\sigma$ a standard deviation of a measured characteristic dimension on several parts;
TS is an upper tolerance of the measured characteristic dimension;
TI is a lower tolerance of the measured characteristic dimension.

8. The method as claimed in claim 1, in which the selected reference dimension corresponds to the characteristic dimension being least adjustable by adjusting the regulating parameters from among the different characteristic dimensions forming the tolerance stack-up.

9. The method as claimed in claim 1, in which the tolerance stack-up comprising two dimensions corresponding respectively to a first characteristic dimension and a second characteristic dimension of the part, in which:
- the reference dimension corresponds to the first characteristic dimension of the tolerance stack-up;
- the area of acceptance of the second characteristic dimension of the tolerance stack-up is calculated from the overall area of acceptance and from the average $\mu_{ref}$ and the standard deviation $\sigma_{ref}$ calculated for the first characteristic dimension, the area of acceptance being constructed with the same one or more statistical criteria as the overall area of acceptance;
- the manufacturing of parts is controlled without verification of the first characteristic dimension by using the area of acceptance calculated for the second characteristic dimension of the tolerance stack-up by adjusting the regulating parameters of the manufacturing device so that the second characteristic dimension of the tolerance stack up is included in the corresponding calculated area of acceptance.

\* \* \* \* \*